United States Patent
Langner

(10) Patent No.: US 11,218,342 B2
(45) Date of Patent: Jan. 4, 2022

(54) APPARATUS AND METHOD FOR HIGH-SPEED ETHERNET OVER STAR QUAD MEDIA

(71) Applicant: Marvell Asia Pte, Ltd., Santa Clara, CA (US)

(72) Inventor: Paul Langner, Fremont, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/935,051

(22) Filed: Jul. 21, 2020

(65) Prior Publication Data

US 2021/0044460 A1 Feb. 11, 2021

Related U.S. Application Data

(63) Continuation of application No. 16/171,298, filed on Oct. 25, 2018, now Pat. No. 10,721,101.

(51) Int. Cl.
| | |
|---|---|
| *H04L 25/02* | (2006.01) |
| *H04L 12/10* | (2006.01) |
| *H01B 11/00* | (2006.01) |
| *H04L 12/40* | (2006.01) |

(52) U.S. Cl.
CPC ........ *H04L 25/0272* (2013.01); *H01B 11/005* (2013.01); *H04L 12/10* (2013.01); *H04L 12/40013* (2013.01); *H04L 2012/40273* (2013.01)

(58) Field of Classification Search
CPC ............... H04L 25/0272; H04L 25/026; H04L 25/0264; H01B 11/02; H01B 11/04; H01R 24/64
See application file for complete search history.

(56) References Cited

U.S. PATENT DOCUMENTS

| | | | | |
|---|---|---|---|---|
| 2011/0243254 A1* | 10/2011 | Pischl | ................. | H04L 25/0276 375/257 |
| 2013/0177099 A1* | 7/2013 | Pischl | ................. | H04L 25/0282 375/285 |
| 2015/0026372 A1* | 1/2015 | Laichinger | .......... | G06F 13/4004 710/105 |

\* cited by examiner

*Primary Examiner* — Kevin Kim

(57) ABSTRACT

An Ethernet link is disclosed. The link includes a first Ethernet transceiver and a second Ethernet transceiver configured as a link partner to the first Ethernet transceiver. A shielded twisted quad (STQ) cable is interposed between the first Ethernet transceiver and the second Ethernet transceiver. The STQ cable includes four conductors, each conductor having a first end interfaced with a corresponding input/output (I/O) circuit of the first Ethernet transceiver in a single-ended configuration, and a second end interfaced with a corresponding input/output (I/O) circuit of the second Ethernet transceiver in a single-ended configuration.

17 Claims, 4 Drawing Sheets

US 11,218,342 B2

APPARATUS AND METHOD FOR HIGH-SPEED ETHERNET OVER STAR QUAD MEDIA

RELATED APPLICATIONS

This Application is a Continuation of U.S. patent application Ser. No. 16/171,298, filed Oct. 25, 2018, entitled APPARATUS AND METHOD FOR HIGH-SPEED ETHERNET OVER STAR QUAD MEDIA, which is expressly incorporated by reference herein.

TECHNICAL FIELD

The disclosure herein relates to communications systems, and more specifically to high-speed Ethernet systems and methods.

BACKGROUND

Wired local area networks (LANs) are often interconnected via Ethernet interfaces based on twisted pair copper cables. High-speed Ethernet standards, such as 10 GBASE-T and NBASE-T, generally utilize four bidirectional differential pairs over distances between 30 to 100 meters with the ability to achieve data rates from 1 Gbps up to 10 Gbps. 10 GBASE-T and NBASE-T transceiver chips often include extensive signal processing capabilities to counter the effects of crosstalk and noise over the 100 meter data links.

Data links employed in automotive applications often involve star quad cables that form two pairs of low voltage differential signaling (LVDS) channels. Typical data rates generally reach between 3 to 6 Gbps over 15 meter link lengths. While beneficial for its intended application, LVDS data rates over star quad media are generally insufficient for expected autonomous driving applications.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Methods and apparatus for Ethernet networks are disclosed. In one embodiment, an Ethernet link is disclosed. The link includes a first Ethernet transceiver and a second Ethernet transceiver configured as a link partner to the first Ethernet transceiver. A star quad cable is interposed between the first Ethernet transceiver and the second Ethernet transceiver. The star quad cable includes four conductors, each conductor having a first end interfaced with a corresponding input/output (I/O) circuit of the first Ethernet transceiver in a single-ended configuration, and a second end interfaced with a corresponding input/output (I/O) circuit of the second Ethernet transceiver in a single-ended configuration.

In another embodiment, an Ethernet network is disclosed. The Ethernet network includes a network hub including multiple Ethernet ports and multiple network devices. Star quad cables are disposed in a point-to-point fashion between each of the multiple Ethernet ports and each of the multiple network devices. Each of the multiple Ethernet ports communicates with each of the multiple network devices via an NBASE-T Ethernet protocol.

Figure 1:
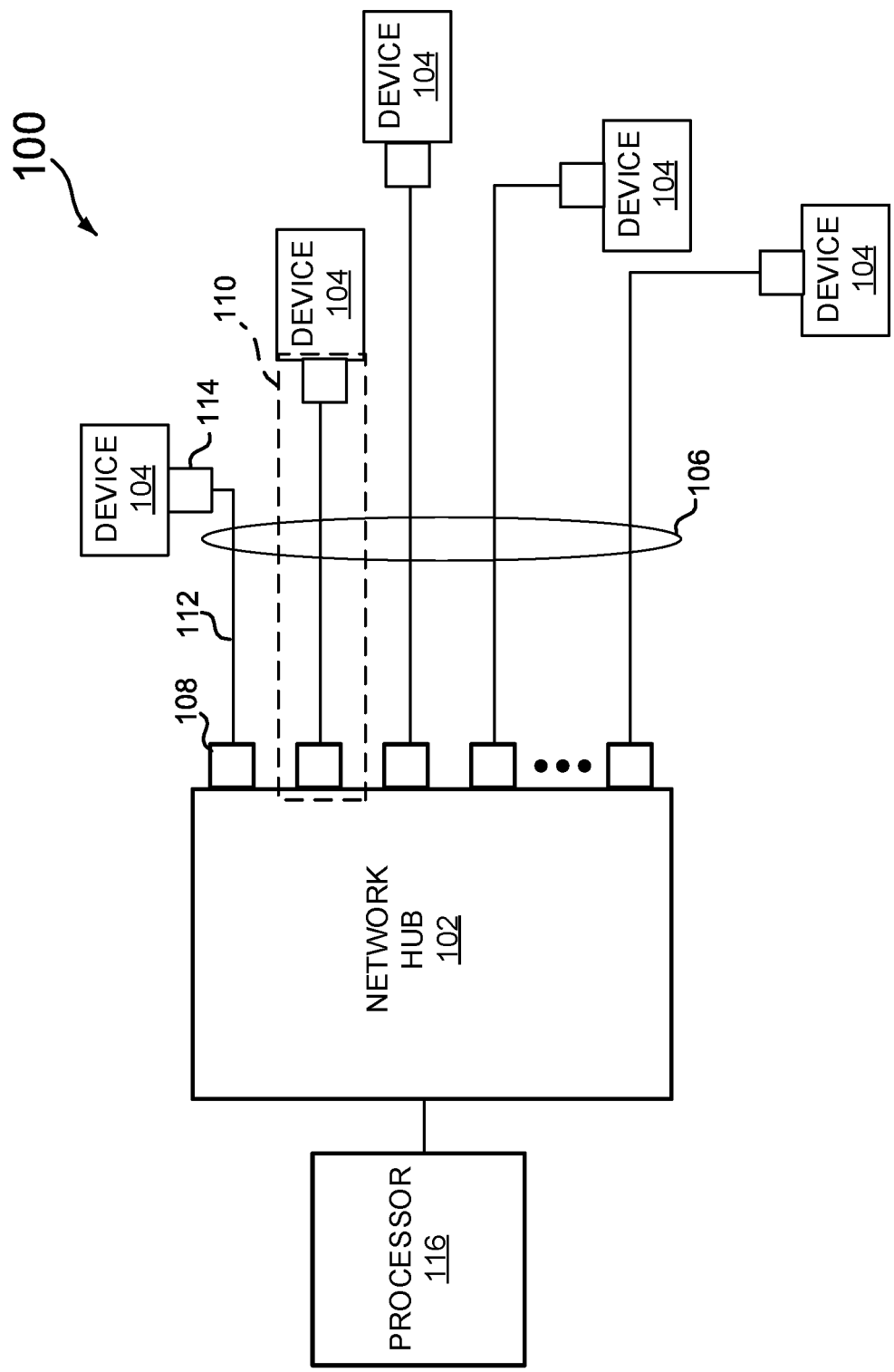
FIG. 1 illustrates one embodiment of an Ethernet network.

Referring now to FIG. 1, one embodiment for a high-speed Ethernet network, generally designated 100, includes a network hub 102 that interfaces with multiple network devices 104, via internally-routed wired signaling media 106 in the form of multi-conductor cables. For one embodiment, the entire system is self-contained within a fixed framework, such as a body of a motor vehicle, aircraft or boat.

Further referring to FIG. 1, the network hub 102 may take the form of a network switch or router to direct traffic between various network nodes defined by the network devices 104. The network hub 102 may include, for example, forty-eight ports 108 to support an equal number of data links 110. Each port 108 connects to a local end of an Ethernet cable 112. A remote end of each cable 112 connects to a network device port 114, connected to, for example, a sensor, video camera or telematics data monitoring device. For one embodiment, each network device 104 generates specific parameter data associated with, for example, imaging information from a certain angle of a right-front fender area of an automobile. Multiple nodes or network devices 104 may thus feed parameter data to the network hub 102, which may then direct the data to, for example, one or more processors 116 to evaluate the data and provide command and control signals to, for example, an autonomous driving system.

Figure 2:
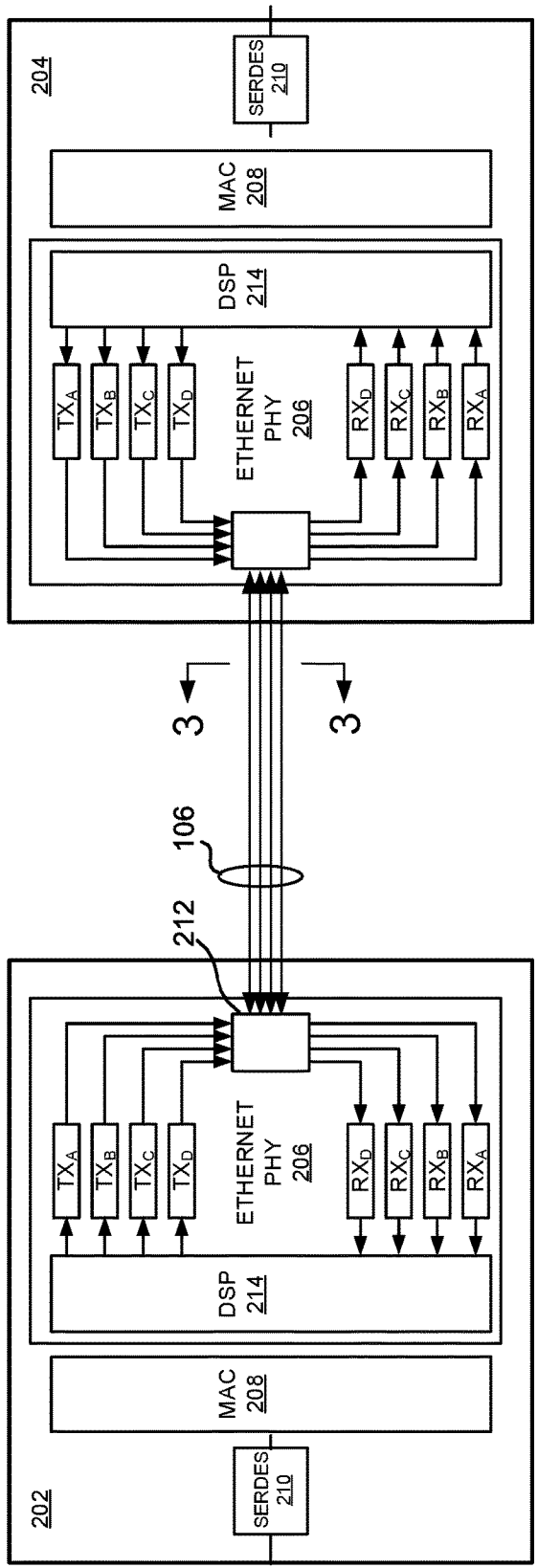
FIG. 2 illustrates one embodiment of a 10 GBASE-T data link employed in the Ethernet network of FIG. 1.

FIG. 2 illustrates one embodiment of a data link 110 used in the network of FIG. 1. Each of the data links 110 includes a local Ethernet transceiver 202 and a remote transceiver 204. The local transceiver 202 is disposed in one of the ports 108 of the network hub 102, while the remote transceiver is disposed on a network device 104. For purposes of brevity, only the local transceiver circuitry will be described, with the understanding that the remote transceiver circuitry is similarly formed.

Further referring to FIG. 2, for one embodiment, the local transceiver 202 comprises a 10 GBASE-T integrated circuit chip that incorporates a physical circuit (PHY) 206, a media access controller (MAC) 208, and a serializer/deserializer (SERDES) interface 210. The PHY 206 incorporates an analog front-end that employs four input/output (I/O) driver/receiver circuits $TX_A/RX_A$, $TX_B/RX_B$, $TX_C/RX_C$ and $TX_D/RX_D$ to transceiver data over four physical channels in accordance with a 10 GBASE-T protocol. The transceiver I/O circuits interface with the Ethernet cable media 106 via a connector interface, at 212. The MAC circuit 124 interfaces the PHY 102 with a SERDES circuit 128. While most of the discussion herein emphasizes use of a 10 GBASE-T transceiver integrated circuit (IC) chip, NBASE-T transceiver IC chips that offer variable data rates between 1 Gbps up to 10 Gbps may also be employed.

With continued reference to FIG. 2, the PHY 206 includes digital signal processing (DSP) logic 214 that provides interference cancellation functionality in response to noise and interference thresholds based on signaling media. Thus, while standardized 10 GBASE-T Ethernet communications over 100 meters involves differential signaling channels with the DSP logic tuned in one operating mode to thresholds associated with cable media such as CAT5 and CAT6, in a second operating mode, the DSP logic 214 is tuned to thresholds associated with single-ended channels coupled to star quad media. The DSP tuning thresholds include, for example, bit error rate (BER), signal-to-noise ratio (SNR), insertion loss, and so forth.

Figure 3:
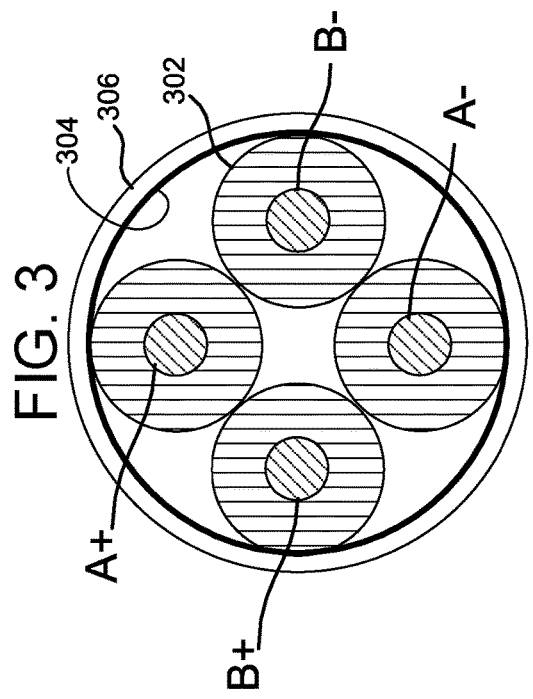
FIG. 3 illustrates a cross-sectional view of a star quad cable for use in the data link of FIG. 2.

For one embodiment, the internally-routed signaling media 106 generally meets and/or exceeds standardized features associated with star quad cabling or media. FIG. 3 illustrates a cross-section of a standard star quad cable along line 3-3 of FIG. 2. The cable includes four conductors A+, A−, B+ and B− that are arranged in a symmetric four-pointed star. Each of the conductors includes a layer of insulation 302. A braided shield 304 and cable jacket 306 surrounds the four conductors. For some embodiments, reinforcement fillers (not shown) may be employed between the conductors and shield to maintain the overall cable geometry. For one embodiment, cable lengths are constrained to lengths up to 15 meters.

Figure 4:
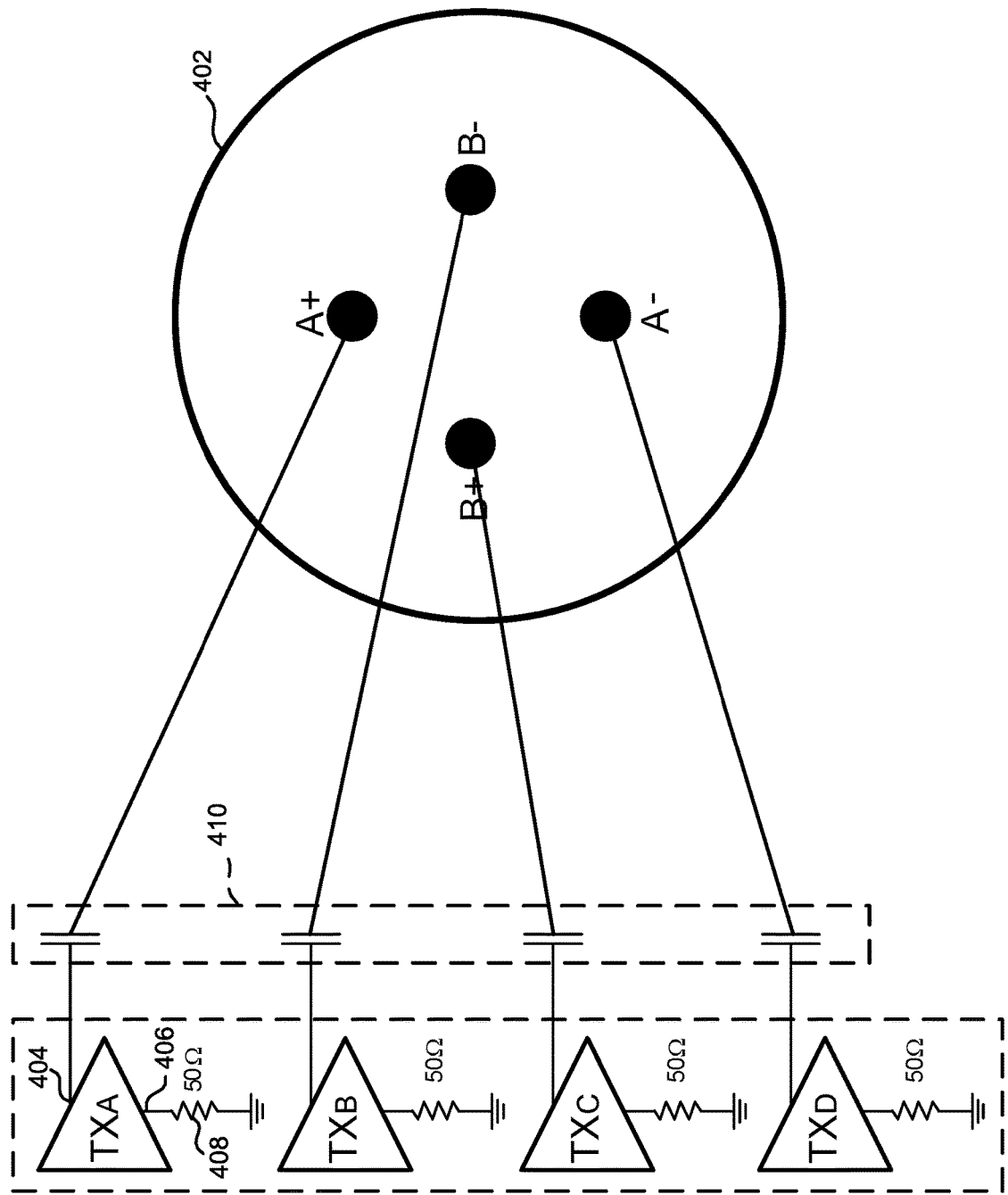
FIG. 4 illustrates one embodiment of a single-ended interface connection between an Ethernet transceiver and a star quad cable.

FIG. 4 illustrates one embodiment of interface connections between I/O circuits (represented by transmitters TXA-TXD) and an STQ cable, at 402. Transmitter circuit TXA connects to a first one of the star quad conductors, such as conductor A+, in a single-ended configuration such that a positive I/O pin for a channel I/O, such as at 404, connects to the conductor A+, while a complement I/O pin, such as at 406, couples to ground via a matching impedance 408. The result is a conversion between the balanced differential lines of the I/O and an unbalanced single-ended line associated with the star quad conductor. For one embodiment, electrostatic discharge (ESD) protection circuitry 410 in the form of a capacitive coupling is provided for each conductor connection to the I/O.

Figure 5B:
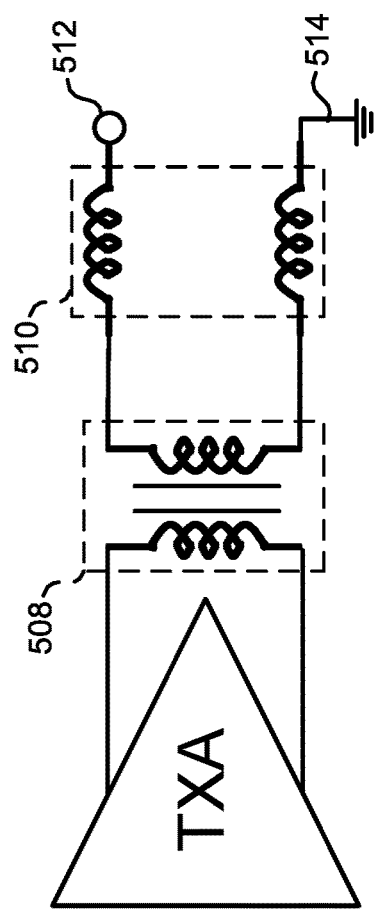
FIG. 5B illustrates a further embodiment of circuitry to convert differential signal levels to a single-ended signal level.
Figure 5A:
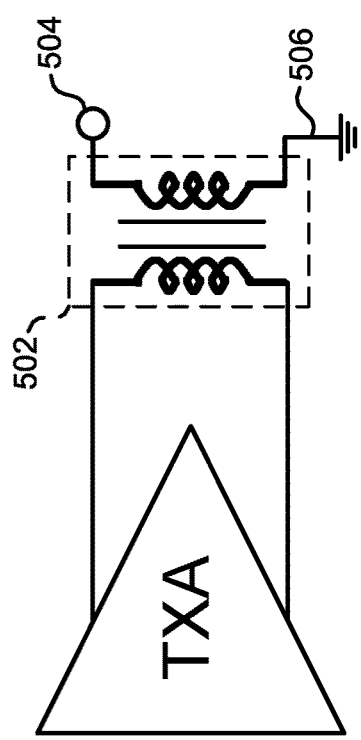
FIG. 5A illustrates an alternative embodiment of circuitry to convert differential signal levels to a single-ended signal level.

FIGS. 5A and 5B illustrate alternative embodiments of the differential-to-single-ended conversion circuitry (often referred to as a balun) and ESD couplings for each conductor connection to an I/O, such as TXA. For one embodiment, shown in FIG. 5A, a differential pair of conductors associated with the I/O couples to a primary winding of a transformer 502. A secondary winding of the transformer has one end tied to a single-ended terminal, at 504, while the other end is grounded, at 506. In this manner, the differential signals of the transceiver I/O are converted to single-ended in a manner that also protects against ESD.

In another embodiment, shown in FIG. 5B, a differential pair of conductors associated with the I/O couples to a primary winding of a transformer 508, similar to the embodiment of FIG. 5A, while a secondary winding of the transformer 508 couples to a choke 510. A first branch of the choke is tied to a single-ended terminal, at 512, while the other branch of the choke is tied to ground, at 514.

For some embodiments, the balun circuitry may be formed off-chip, while in other embodiments, on-chip circuitry may be employed.

In operation, data generated by a given network device may be fed to the four channels of a given 10 GBASE-T Ethernet PHY, and transmitted via the four single-ended transmit I/Os over the four star quad conductors at individual data rates of up to 2.5 Gbps, such that the aggregate data rate for the four channels is up to 10 Gbps. For one embodiment, data link lengths are constrained to be no greater than 15 meters in length. Thus, noise in the form of echo, reflections, crosstalk and so forth may be canceled out via the digital processing circuitry formed in each transceiver PHY even though the channels are single-ended.

The network architecture described above lends itself well to autonomous driving applications where data rates upwards of 8 Gbps to 10 Gbps may be necessary in an effort to evaluate vast swaths of data generated by numerous video cameras and sensors. By incorporating a 10 GBASE-T Ethernet network within an autonomous driving system, proven high-speed communications within an automotive environment may be realized. Additionally, by altering the 10 GBASE-T communications channels to support single-ended channel configurations, the four channels of a 10 GBASE-T transceiver may be coupled to the four conductors of a star quad cable.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. An Ethernet transceiver circuit, comprising:
    four transmit/receive input/output (I/O) circuits configured as differential transceivers to transmit and receive data over a wired coupling in accordance with an Ethernet protocol;
    a signaling interface configured to communicatively couple the four transmit/receive I/O circuits to four corresponding shielded twisted quad (STQ) conductors in a single-ended configuration to form four Ethernet signaling channels over the wired coupling.

2. The Ethernet transceiver circuit of claim 1, wherein:
    ones of the differential transceivers are configured with respective positive signal pins to transmit and receive positive components of differential data signals and complement signal pins to transmit and receive complement components of differential data signals; and
    the signaling interface is configured to transfer the positive components of the differential data signals to and from the four transmit/receive I/O circuits as single-ended data signals to and from the four STQ conductors.

3. The Ethernet transceiver of claim 2, wherein the signaling interface further comprises:
    differential-to-single-ended converter circuitry that is configured to convert differential transmit data transmitted from ones of the four differential transceivers to single-ended transmit data for transmission over corresponding ones of the four STQ conductors.

4. The Ethernet transceiver of claim 3, wherein the differential-to-single-ended converter circuitry comprises:
    transformer circuitry configured for coupling to ones of the four differential transceivers, the transformer circuitry including
        primary coil circuitry having a first terminal coupled to the positive signal pin of a corresponding differential transceiver, the primary coil circuitry having a second terminal coupled to the complement signal pin of the corresponding differential transceiver, the primary coil circuitry to convert the differential data signal to an electromagnetic signal; and
        secondary coil circuitry including a secondary coil winding disposed in electromagnetic communication with the primary coil circuitry to receive the electromagnetic signal and to convert the electromagnetic signal to a single-ended data signal.

5. The Ethernet transceiver of claim 4, wherein:
    the secondary coil winding includes a third terminal coupled to a corresponding one of the four STQ conductors, and a fourth terminal terminated to a reference, the reference configured as a ground connection to provide an electrostatic-discharge (ESD) path.

6. The Ethernet transceiver of claim 4, wherein the secondary coil circuitry further comprises:
    a choke circuit to filter high-frequency interference from the data signals, the choke circuit including a first inductor branch coupled to a corresponding one of the four STQ conductors, and a second inductor branch terminated to a reference, the reference configured as a ground connection to provide an electrostatic-discharge (ESD) path; and
    wherein the secondary coil winding includes a third terminal coupled to the first inductor branch of the choke circuit and a fourth terminal coupled to the second inductor branch of the choke circuit.

7. The Ethernet transceiver of claim 1, wherein:
    the four transmit/receive I/O circuits are configured to transmit and receive data associated with operating a motor vehicle, an aircraft, or a boat.

8. An Ethernet link, comprising:
    a first Ethernet transceiver including a first group of four transmit/receive input/output (I/O) circuits configured as a first group of differential transceivers to transmit first data and receive second data over a first wired coupling in accordance with an Ethernet protocol;
    a second Ethernet transceiver configured as a link partner to the first Ethernet transceiver, the second transceiver including a second group of four transmit/receive input/output (I/O) circuits configured as a second group of differential transceivers to receive the first data and transmit the second data over a second wired coupling in accordance with the Ethernet protocol; and
    four corresponding shielded twisted quad (STQ) conductors in a single wired coupling interfaced in a first single-ended configuration with the first group of four transmit/receive I/O circuits with first interface circuitry and interfaced in a second single-ended configuration with the second group of four transmit/receive I/O circuits with second interface circuitry to form four Ethernet signaling channels over the single wired coupling.

9. The Ethernet link of claim 8, wherein:
    ones of the first group of differential transceivers are configured with respective positive signal pins to transmit and receive positive components of differential data signals and complement signal pins to transmit and receive complement components of differential data signals; and
    the first interface circuitry and the second interface circuitry are configured to transfer the positive components of the differential data signals as single-ended data signals to and from the corresponding first group of four transmit/receive I/O circuits and the corresponding second group of four transmit/receive I/O circuits via the four STQ conductors.

10. The Ethernet link of claim 9, wherein each of the first interface circuitry and the second interface circuitry further comprises:
- differential-to-single-ended converter circuitry that is configured to convert differential transmit data to single-ended transmit data for transmission over the four STQ conductors.

11. The Ethernet link of claim 10, wherein the differential-to-single-ended converter circuitry for each of the first interface circuitry and the second interface circuitry comprises:
- transformer circuitry configured for coupling to ones of the four differential transceivers of the corresponding first interface circuitry or the second interface circuitry, the transformer circuitry including
- primary coil circuitry having a first terminal coupled to the positive signal pin of a corresponding differential transceiver, the primary coil circuitry having a second terminal coupled to the complement signal pin of the corresponding differential transceiver, the primary coil circuitry to convert the differential data signal to an electromagnetic signal; and
- secondary coil circuitry including a secondary coil winding disposed in electromagnetic communication with the primary coil circuitry to receive the electromagnetic signal and to convert the electromagnetic signal to a single-ended data signal.

12. The Ethernet link of claim 11, wherein:
- the secondary coil winding includes a third terminal coupled to a corresponding one of the four STQ conductors, and a fourth terminal terminated to a reference, the reference configured as a ground connection to provide an electrostatic-discharge (ESD) path.

13. The Ethernet link of claim 11, wherein the secondary coil circuitry further comprises:
- a choke circuit to filter high-frequency interference from the data signals, the choke circuit including a first inductor branch coupled to a corresponding one of the four STQ conductors, and a second inductor branch terminated to a reference, the reference configured as a ground connection to provide an electrostatic-discharge (ESD) path; and
- wherein the secondary coil winding includes a third terminal coupled to the first inductor branch of the choke circuit and a fourth terminal coupled to the second inductor branch of the choke circuit.

14. The Ethernet link of claim 8, wherein:
- the four transmit/receive I/O circuits for each of the first Ethernet transceiver and the second Ethernet transceiver are configured to transmit and receive data associated with operating a motor vehicle, an aircraft, or a boat.

15. A networking system within a closed operating environment, comprising:
- a wired signaling medium comprising four corresponding shielded twisted quad (STQ) conductors in a single wired coupling;
- a network hub comprising a first Ethernet transceiver, the first Ethernet transceiver including a first group of four transmit/receive input/output (I/O) circuits configured as a first group of differential transceivers to transmit first data and receive second data over the single wired coupling in accordance with an Ethernet protocol;
- at least one network device comprising a second Ethernet transceiver configured as a link partner to the first Ethernet transceiver, the second transceiver including a second group of four transmit/receive input/output (I/O) circuits configured as a second group of differential transceivers to receive the first data and transmit the second data over the single wired coupling in accordance with the Ethernet protocol;
- wherein the four STQ conductors are interfaced with the first group of four transmit/receive I/O circuits with first interface circuitry to form a first set of single-ended couplings, and interfaced with the second group of four transmit/receive I/O circuits with second interface circuitry to form a second set of single-ended couplings to form four Ethernet signaling channels over the single wired coupling.

16. The networking system of claim 15, wherein:
- the closed operating environment comprises an area within a body of a motor vehicle, an aircraft, or a boat.

17. The networking system of claim 16, wherein the at least one network device comprises:
- at least one data generation device to generate data associated with operating the motor vehicle, the aircraft, or the boat.

* * * * *